July 7, 1925. 1,544,993
G. H. KNIGHT
FRICTION CLUTCH
Filed Oct. 10, 1921  2 Sheets-Sheet 2
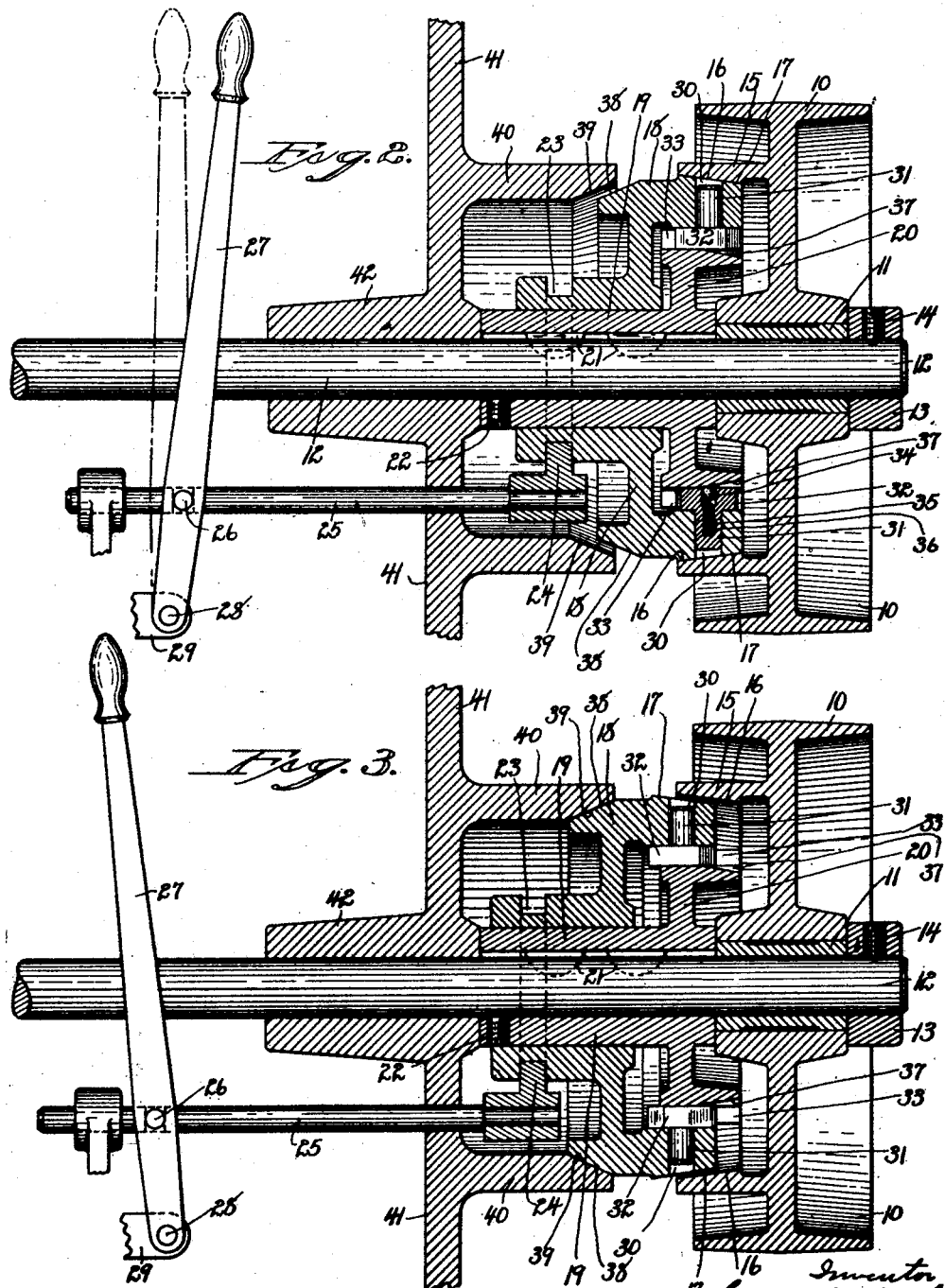

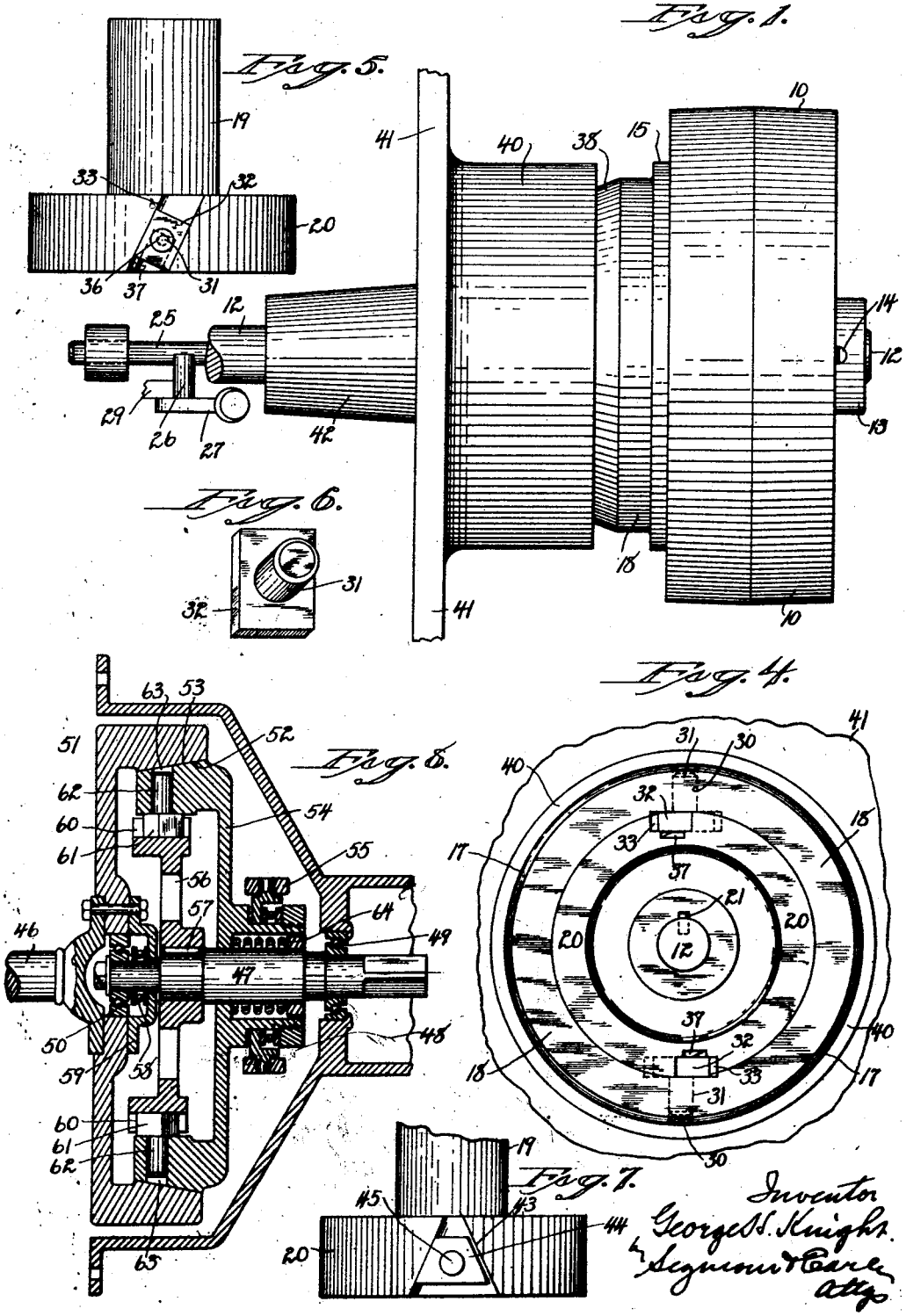

Patented July 7, 1925.

1,544,993

UNITED STATES PATENT OFFICE.

GEORGE H. KNIGHT, OF TORRINGTON, CONNECTICUT.

FRICTION CLUTCH.

Application filed October 10, 1921. Serial No. 506,568.

*To all whom it may concern:*

Be it known that I, GEORGE H. KNIGHT, a citizen of the United States, residing at Torrington, in the county of Litchfield and State of Connecticut, have invented a new and useful Improvement in Friction Clutches; and I do hereby declare the following, when taken in connection with the accompanying drawings and the characters of reference marked thereon, to be a full, clear, and exact description of the same, and which said drawings constitute part of this application, and represent, in—

Fig. 1 a plan view of my improved clutch as applied to a machine-frame which is broken away.

Fig. 2 a view thereof in vertical central section with the clutch shown as engaged.

Fig. 3 a corresponding view with the clutch shown in its braking position.

Fig. 4 a view of the same in end elevation with the driving-member or pulley removed.

Fig. 5 a detached plan view of the driven-member.

Fig. 6 a detached perspective view of one of the coupling-shoes, together with it stem.

Fig. 7 a view corresponding to Figure 5 but showing a modified form of groove and coupling-shoes.

Fig. 8 a broken view in vertical central section of a form which my improved clutch may assume when applied to an automobile.

My invention relates to an improved friction clutch for use in a great variety of situations where power is applied and released, such as in machine tools, machinery, automobiles, motor-boats, etc., the object being to produce a simple, compact, durable, reliable, easily operated mechanism of superior efficiency.

With these ends in view, my invention consists in a friction clutch having certain details of construction and combinations of parts as will be hereinafter described and pointed out in the claims.

In carrying out my invention, as shown by Figures 1 to 7 inclusive, I employ a driving-pulley 10 provided with an anti-friction bushing 11 of bronze or other suitable material and loosely mounted upon a driven shaft 12, on which it is retained by a collar 13 having a set-screw 14.

The said pulley 10 is formed upon its inner face with an integral driving cone 15 having an internal conical friction face 16 co-acting with a similar conical external friction face 17 formed upon an intermediate clutch member 18 having limited helical movement upon the hub 19 of a driven member 20 secured by keys 21 and a set-screw 22 to the shaft 12 aforesaid.

The said intermediate member 18 has an annular groove 23 receiving an ordinary shifting-fork 24 mounted upon the adjacent end of a shifter-rod 25 coupled by a pin 26 to an ordinary clutch-handle 27, the lower end of which is mounted upon a stud 28 in a bracket 29, which may represent any fixed point. The cone-shaped outer rim of the helically movable member 18 is formed with two radial circular holes 30 located diametrically opposite each other and receiving the stud-like hollow stems 31 of rectangular coupling-shoes 32 respectively located in helical grooves 33 formed at diametrically opposite points in the periphery of the driven-member 20 and having angular relation to the axis of the clutch, this relation corresponding to the angular relation of the pitch of a screw-thread to the axis of the screw. The helically movable intermediate member 18 may, therefore, be viewed as a nut threaded upon the driven-member 20 through the medium of coupling members traveling in grooves which are, to all intents and purposes, helical grooves.

In order to prevent the parts from "working out" or, in other words, the separation of the driving and intermediate members 10 and 18 under excessive vibration or when operating under a very light load, I employ two spring checks each consisting of a ball 34 and spring 35 located in pockets 36 in the shoes 32 and their stems 31, as shown in Figure 2, the balls 34 co-acting with the bottoms of inclined slots 37 in the bottoms of the grooves 33 in the periphery of the driven-member 20. I do not, however, limit myself to any particular device for the purpose indicated. The ball and spring construction just described is automatically brought into action when the said intermediate and driving members are moved toward each other and operates to nullify the tendency of the said members to separate under vibration or a light load. On the other hand, the said nullifying means is automatically thrown out of action when the said members are separated, whereas, in similar clutches of the prior art, means such as springs have been employed to exert a constant effort to move the intermediate and driving members into engagement, necessitating means for restraining such movement when the said members are separated.

In the application of my invention, shown in Figures 1 to 7 inclusive, the intermediate member 18 is formed upon the inner edge of its periphery with a conical brake-surface 38 coacting with a corresponding surface 39 within the edge of an annular brake-flange 40 integral with a machine-frame 41, shown as having a hub 42 in which the driven-shaft 12 turns.

In the operation of my improved friction clutch, the helically movable intermediate member 18 is first manually slid outward by the operation of the clutch-handle 27, whereby its conical friction face 17 is brought into engagement with the corresponding friction face 16 of the cone 15 of the driving-pulley 10, the helical movement of the said member 18 at this time being imparted to it by the co-action of the shoes 32 with the helical grooves 33 in the periphery of the driven-member. When the friction faces 16 and 17 make their initial contact as the result of this helical movement, as described, the intermediate member starts to turn with the driving-member, with the result that the driving-torque thereof is immediately utilized to continue this helical movement, with the effect of tightly jamming the two friction faces 16 and 17 together. The result of the action described is to couple the driving, intermediate and driven members together, so as to virtually constitute one piece for turning the shaft 12, and the greater the load on the shaft 12 the harder the faces 16 and 17 will be jammed together. Notwithstanding the power of this jamming action, it depends solely upon the frictional engagement of the faces 16 and 17. Therefore, the instant these faces are disengaged by the reverse action of the clutch-lever 27, the force which normally tends to jam them together ceases. It is one of the characteristics of the operation of my improved clutch that although very powerful when in action, the effort to throw it out is surprisingly slight.

In some classes of machines provided with my improved friction clutch, such as shapers, it is desirable to stop the machine almost instantly after the power is thrown off. For this purpose my clutch may include a brake feature, as shown in Figures 1 to 3 inclusive, so that, by continuing the release movement of the clutch-handle 27, the friction face 38 of the intermediate member 18 is brought into engagement with the friction face 39 of the machine-frame 41, as shown in Figure 3, whereby the turning of the intermediate member 18 and whatever parts are coupled thereto are stopped. When the brake is applied as described, the shoes 32 operate reversely in the grooves 33 to assist the braking action of the device just as they before acted in transmitting the power, the faces 38 and 39 being jammed together by the action of the shoes in the same manner that the faces 16 and 17 are jammed together by the action of the shoes.

To adapt my improved clutch to drive in either direction, it is only necessary to provide the periphery of the driven-member, as shown in Figure 7, with substantially triangular or wedge-shaped grooves 43, only one of which is shown, and to employ corresponding wedge-shaped shoes 44 having stems 45, only one of these shoes being shown. With such a construction, the friction clutch operates precisely in the manner described with the exception that it operates in either direction and is therefore applicable in situations where a reverse drive is called for. Or a device constructed in accordance with the modification shown by Figure 7 may be used either for a right or left drive.

In Figure 8 I have shown my improved clutch adapted for use in automobiles, in which the clutch is interposed, as it were, between the engine or crank-shaft 46 and the usual intermediate-shaft 47, which latter extends into the gear-box 48, the said intermediate-shaft being journalled at its rear end in a combined radial and thrust bearing 49 and at its forward end in a radial bearing 50. In this construction the fly-wheel 51, which is bolted, as shown, to the rear end of the crank-shaft 46, corresponds to the driving-member or pulley 10 of the construction first described. The said fly-wheel 51 is provided with a conical friction face 52 co-acting with a corresponding face 53 upon the periphery of an intermediate member 54 corresponding to the intermediate member 18 of the previous figures. The said intermediate member 54 is loosely mounted on the intermediate-shaft 47, on which it has helical movement effected by means of a shifting-fork 55 of ordinary construction. The driven-member 56 is secured by a key 57 directly to the shaft 47. For preventing the forward displacement of the fly-wheel 51 under operating strains, I employ a thrust-bearing 58 located within a cup-like abutment-plate 59, the forward face of which engages with the bearing 58. The periphery of the driven-member 56 is provided at diametrically opposite points with helical grooves 60 corresponding to the helical grooves 33 already described, these grooves receiving shoes 61 corresponding to the shoes 32 and having stems 62 corresponding to the stems 31 for entrance into radial holes 63 corresponding to the holes 30. The operation of the device shown by Figure 8, now being described, is the same as the operation described for construction of Figures 1 to 6 inclusive, except that there is no provision for a brake action, since none is called for in automobile construction. Furthermore, the usual clutch-spring 64 of an automobile assists in maintaining the friction faces 52 and 53 in contact.

It is obvious that instead of applying the power to the pulley 10 and transmitting it to the shaft 12, it might be applied to the shaft 12 and transmitted by the mechanism shown and described to the pulley 10 without changing the mechanism or the mode of its operation.

I may add that I have used the term "helical" in the above description and also in the claims to describe the essential character of the movement of the intermediate member, since its action is that of a screw under the control of a thread, although in practice the grooves 33 in the driven-member are so exceedingly short that they may be formed by a milling diagonally across the periphery of the member without giving their side walls any curvature, notwithstanding which they will still act to impart movement of a helical character to the intermediate member.

I claim:

1. In a friction clutch, the combination with the driving and driven members thereof, of an intermediate member having limited helical movement, whereby the intermediate member and the driving member are frictionally coupled by the torque of the driving member, and means automatically brought into action when the said intermediate and driving members are moved toward each other, for nullifying their tendency to separate under vibration or a light load, and automatically thrown out of action when the said members are separated.

2. In a friction clutch, the combination with the driving and driven members thereof, of an intermediate member capable of limited helical movement, whereby the intermediate and driving members are frictionally coupled by the torque of the driving member, and means carried by the said intermediate member and co-acting with the said driven member for nullifying the tendency of the said intermediate and driving members to separate under vibration or a light load.

3. A friction clutch having driving and driven members, an intermediate member having limited helical movement, whereby the driving torque of the driving member is utilized to increase the frictional engagement between the intermediate member and one of the other members, coupling-shoes interposed between the intermediate member and the driven member and operating in helical paths in one of the members, and means carried by the said shoes for nullifying the tendency of the members to separate under vibration or a light load.

4. In a friction clutch, the combination with the driving and driven members thereof, of an intermediate member having limited helical movement, whereby the said intermediate member and one of the other members are frictionally coupled by the torque of the driving member, and means automatically brought into action when the said intermediate and co-acting members are moved toward each other for nullifying their tendency to separate under vibration or a light load and automatically thrown out of action when the said members are separated.

In testimony whereof, I have signed this specification in the presence of two subscribing witnesses.

GEORGE H. KNIGHT.

Witnesses:
G. ALLEN MARSH,
CHARLES W. HILLS.